US012775888B2

(12) United States Patent
Hakimi et al.

(10) Patent No.: US 12,775,888 B2
(45) Date of Patent: Oct. 27, 2026

(54) SYSTEM AND METHOD FOR VISUALIZING GOALS, RELATIONSHIPS, AND PROGRESS

(71) Applicant: TOYOTA RESEARCH INSTITUTE, INC., Los Altos, CA (US)

(72) Inventors: Shabnam Hakimi, San Francisco, CA (US); Matthew Len Lee, Mountain View, CA (US); Charlene C. Wu, San Francisco, CA (US); Nikos Arechiga, San Mateo, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 1187 days.

(21) Appl. No.: 17/499,805

(22) Filed: Oct. 12, 2021

(65) Prior Publication Data

US 2023/0114736 A1 Apr. 13, 2023

(51) Int. Cl.

| | |
|---|---|
| ***G06Q 10/00*** | (2026.01) |
| ***G02B 27/01*** | (2006.01) |
| ***G06N 3/04*** | (2023.01) |
| ***G06T 11/60*** | (2026.01) |
| ***G06T 19/00*** | (2011.01) |

(52) U.S. Cl.

CPC ........... *G06Q 10/00* (2013.01); *G02B 27/017* (2013.01); *G06N 3/04* (2013.01); *G06T 11/60* (2013.01); *G06T 19/006* (2013.01)

(58) Field of Classification Search

CPC ... G06Q 10/00; G06T 19/006; G06T 2200/24; G06N 3/063; G06N 5/022

See application file for complete search history.

(56) References Cited

U.S. PATENT DOCUMENTS 4,358,105 A * 11/1982 Sweeney, Jr. .......... A63B 24/00 482/64
8,745,504 B1 6/2014 Li et al.
(Continued)

FOREIGN PATENT DOCUMENTS

| | | | |
|---|---|---|---|
| CA | 2907351 C * | 8/2021 | |
| RU | 113384 U1 | 2/2012 | |

(Continued)

OTHER PUBLICATIONS

Gunther H. Weber, Member, IEEE Computer Society, Peer-Timo Bremer, Member, IEEE and Valerio Pascucci, Member, IEEE, "Topological Landscapes: A Terrain Metaphor for Scientific Data", IEEE Transactions on Visualization and Computer Graphics, vol. 13, p. 1416-1423 (Year: 2007).*
(Continued)

*Primary Examiner* — Ann J Lo
(74) *Attorney, Agent, or Firm* — SEYFARTH SHAW LLP

(57) ABSTRACT

A method for goal progression and visualization is described. The method includes generating a graph-like structure according to user specified goals along with their associated timeframes and desired outcomes. The method also includes converting the graph-like structure into a topological landscape of hills and valleys representing the user specified goals along with the associated timeframes and desired outcomes. The method further includes displaying the topological landscape of hills and valleys representing the user specified goals along with the associated timeframes and desired outcomes.

15 Claims, 6 Drawing Sheets

(56) References Cited

U.S. PATENT DOCUMENTS

| | | | | |
|---|---|---|---|---|
| 2014/0250043 | A1* | 9/2014 | Malinsky | G16H 20/70 706/46 |
| 2015/0276419 | A1* | 10/2015 | Hashem | G01C 21/20 701/425 |
| 2016/0210577 | A1 | 7/2016 | Amundson et al. | |
| 2017/0316212 | A1* | 11/2017 | Tripp | G06F 21/577 |
| 2018/0032878 | A1 | 2/2018 | Hintz et al. | |
| 2018/0158245 | A1* | 6/2018 | Govindan | G06F 16/248 |
| 2019/0370026 | A1 | 12/2019 | Schutman et al. | |
| 2020/0327733 | A1* | 10/2020 | Mueller | G06F 3/04845 |
| 2021/0073293 | A1* | 3/2021 | Fenton | H04L 51/08 |

FOREIGN PATENT DOCUMENTS

| | | | | |
|---|---|---|---|---|
| WO | 2013055966 | A1 | 4/2013 | |
| WO | WO-2018136517 | A1 * | 7/2018 | G06F 3/011 |
| WO | 2019165371 | A1 | 8/2019 | |

OTHER PUBLICATIONS

Harvey, William, and Yusu Wang. "Topological Landscape Ensembles for Visualization of Scalar-Valued Functions." Computer Graphics Forum, vol. 29, No. 3, Jun. 1, 2010, pp. 993-1002, https://doi.org/10.1111/j.1467-8659.2009.01706.x. Accessed May 6, 2025. (Year: 2010).*

Jun Hong, "Goal Recognition through Goal Graph Analysis", Journal of Artificial Intelligence Research (Year: 2001).*

Angela Borchert, Maritta Heisel, "Conflict Identification and Resolution for Trust-Related Requirements Elicitaion A Goal Modeling Approach", Journal of Wireless Mobile Networks, Mar. 31, 2021, p. 111-131 (Year: 2021).*

Oesterling, P., Heine, C., Weber, G. H., & Scheuermann, G. (2012). Visualizing nd point clouds as topological landscape profiles to guide local data analysis. IEEE transactions on visualization and computer graphics, 19(3), 514-526. (Year: 2012).*

Borchert, A., & Heisel, M. (2021). Conflict Identification and Resolution for Trust-Related Requirements Elicitation A Goal Modeling Approach. J. Wirel. Mob. Networks Ubiquitous Comput. Dependable Appl., 12(1), 111-131. (Year: 2021).*

Hong, J. (2001). Goal recognition through goal graph analysis. Journal of Artificial Intelligence Research, 15, 1-30. (Year: 2001).*

* cited by examiner

SYSTEM AND METHOD FOR VISUALIZING GOALS, RELATIONSHIPS, AND PROGRESS

BACKGROUND

Field

Certain aspects of the present disclosure generally relate to machine learning and, more particularly, to a system and method for visualizing goals, relationships, and progress.

Background

Many people find themselves in real-world situations in which attaining a goal involves changing a behavior in a way that expends willpower. These people may often have to pursue multiple goals simultaneously and need effective ways to organize and prioritize their goals. For example, their goals can stretch out over time and may be related to each other and, depending on the number of their goals, it is often difficult to keep track of these relationships. Furthermore, a lack of a sense of progress towards goals can decrease motivation and engagement, which fails to provide further progress to achieving their goals.

Conventional systems for visualizing goals and sub-goals do so as a hierarchy of text. These conventional systems are often too rigid to provide users with sufficient understanding as to the relationships and progress of their goals. A system to increase user awareness of the user's goals, how the user's goals relate to each other, as well as the user's progress towards the user's goals by organizing and visualizing the user's goals, is desired.

SUMMARY

A method for goal progression and visualization is described. The method includes generating a graph-like structure according to user specified goals along with their associated timeframes and desired outcomes. The method also includes converting the graph-like structure into a topological landscape of hills and valleys representing the user specified goals along with the associated timeframes and desired outcomes. The method further includes displaying the topological landscape of hills and valleys representing the user specified goals along with the associated timeframes and desired outcomes.

A non-transitory computer-readable medium having program code recorded thereon for goal progression and visualization is described. The program code is executed by a processor. The non-transitory computer-readable medium includes program code to generate a graph-like structure according to user specified goals along with their associated timeframes and desired outcomes. The non-transitory computer-readable medium also includes program code to convert the graph-like structure into a topological landscape of hills and valleys representing the user specified goals along with the associated timeframes and desired outcomes. The non-transitory computer-readable medium further includes program code to display the topological landscape of hills and valleys representing the user specified goals along with the associated timeframes and desired outcomes.

A system for goal progression and visualization is described. The system includes a goal specifier and connector module to generate a graph-like structure according to user specified goals along with their associated timeframes and desired outcomes. The system also includes a goal landscape visualization module to convert the graph-like structure into a topological landscape of hills and valleys representing the user specified goals along with the associated timeframes and desired outcomes. The system further includes a goal landscape display module to display the topological landscape of hills and valleys representing the user specified goals along with the associated timeframes and desired outcomes.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
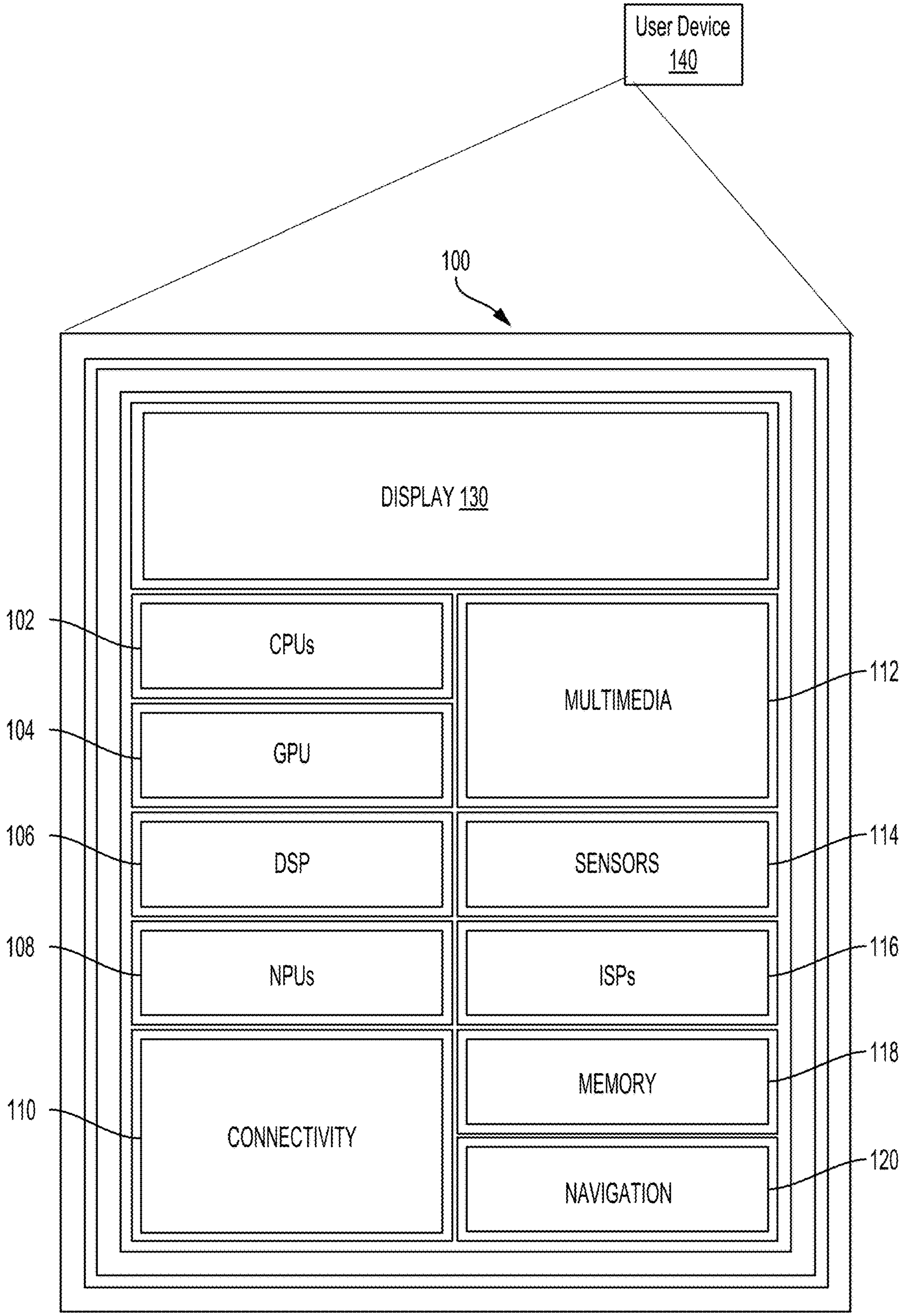
FIG. 1 illustrates an example implementation of designing a neural network using a system-on-a-chip (SOC) of an augmented reality goal assistance system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

The world is filled with temptations. Consequently, many people find themselves in real-world situations in which attaining a goal involves various challenges, such as changing a behavior. These people may often have to pursue multiple goals simultaneously and need effective ways to organize and prioritize their goals. For example, their goals can stretch out over time and may be related to each other and, depending on the number of their goals, it is often difficult to keep track of these relationships. Furthermore, a lack of a sense of progress towards goals can decrease motivation and engagement, which fails to provide further progress to achieving their goals.

Conventional systems for visualizing goals and sub-goals do so as a hierarchy of text. These conventional systems are often too rigid to provide users with sufficient understanding as to the relationships and progress of their goals. A system to increase user awareness of the user's goals, how the user's goals relate to each other, as well as the user's progress towards the user's goals by organizing and visualizing the user's goals, is desired.

Aspects of the present disclosure are directed to a goal progression and visualization system. In particular, some aspects of the present disclosure may utilize a graph-like structure to provide more flexible goal representation, as opposed to a strictly hierarchical structure. This graph-like structure may account for progress towards multiple goals according to their relationships, as well as highlighting proximal goals being achieved while allowing the user to maintain their motivation by keeping the larger goal in view. By maintaining a display of both proximal and distal goals and their rewards, the goal progression and visualization system can help reduce temporal discounting of distal goals, while increasing motivation using principles related to episodic simulation. By storing current and historical goal information, the goal progression and visualization system helps reduce the cognitive load associated with maintaining active mental representations of multiple goals, according to aspects of the present disclosure.

In some aspects of the present disclosure, the goal progression and visualization system includes a goal specifier and connector, a goal landscape visualizer, and a goal updater. In one configuration, the goal specifier and connector component allows the user to specify goals along with their associated timeframes and desired outcomes. The goal progression and visualization system may elicit from the user alternative actions for achieving the goal and the effort associated with the alternative actions. With each new goal specified, the goal progression and visualization system can help the user organize how new goals are related to current and/or previous goals. For example, the goal progression and visualization system can ask the user whether a given goal helps bring the user closer to another goal, provides an alternative path towards a goal, or hinders the achievement of an existing goal.

In some aspects of the present disclosure, the goal landscape visualizer component may take the graph structure and visualize it as a topological landscape with hills and valleys. For example, goals that are difficult to achieve from a given point might be far ahead on tall hills. By contrast, goals that are relatively easier to achieve are close ahead and are displayed at level ground or even downhill. In this example, the user relies on the landscape to identify which paths and sub-goals may be most worthwhile to pursue. For example, goals with steady effort or goals with easy initial paths may be worthwhile to pursue because they are a simpler way to gain progress. The visualizer component can also highlight goal states that are currently achievable from the user's current state, as well as allow the user to look ahead to a more distant goal to remind the user of the ultimate outcome (and associated core rewards), which can facilitate motivation. In some aspects of the present disclosure, the visualization can be shown on an interactive computer display (e.g., tablet, monitor) or in a more immersive 3D virtual reality (e.g., Oculus) environment.

FIG. 1 illustrates an example implementation of the aforementioned system and method for a goal progression and visualization system using a system-on-a-chip (SOC) 100, according to aspects of the present disclosure. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, select a control action, according to the display 130 illustrating a view of a user device.

In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system. The SOC 100 may be based on an Advanced Risk Machine (ARM) instruction set or the like. In another aspect of the present disclosure, the SOC 100 may be a server computer in communication with a user device 140. In this arrangement, the user device 140 may include a processor and other features of the SOC 100.

In this aspect of the present disclosure, instructions loaded into a processor (e.g., CPU 102) or the NPU 108 of the user device 140 may include code to generate goal progression and visualization. The instructions loaded into a processor (e.g., CPU 102) may also include code to generate a graph-like structure according to user specified goals along with their associated timeframes and desired outcomes. The instructions loaded into a processor (e.g., CPU 102) may also include code to convert the graph-like structure into a topological landscape of hills and valleys representing the user specified goals along with their associated timeframes and desired outcomes. The instructions loaded into a processor (e.g., CPU 102) may also include code to display the topological landscape of hills and valleys representing the user specified goals along with their associated timeframes and desired outcomes.

Figure 2:
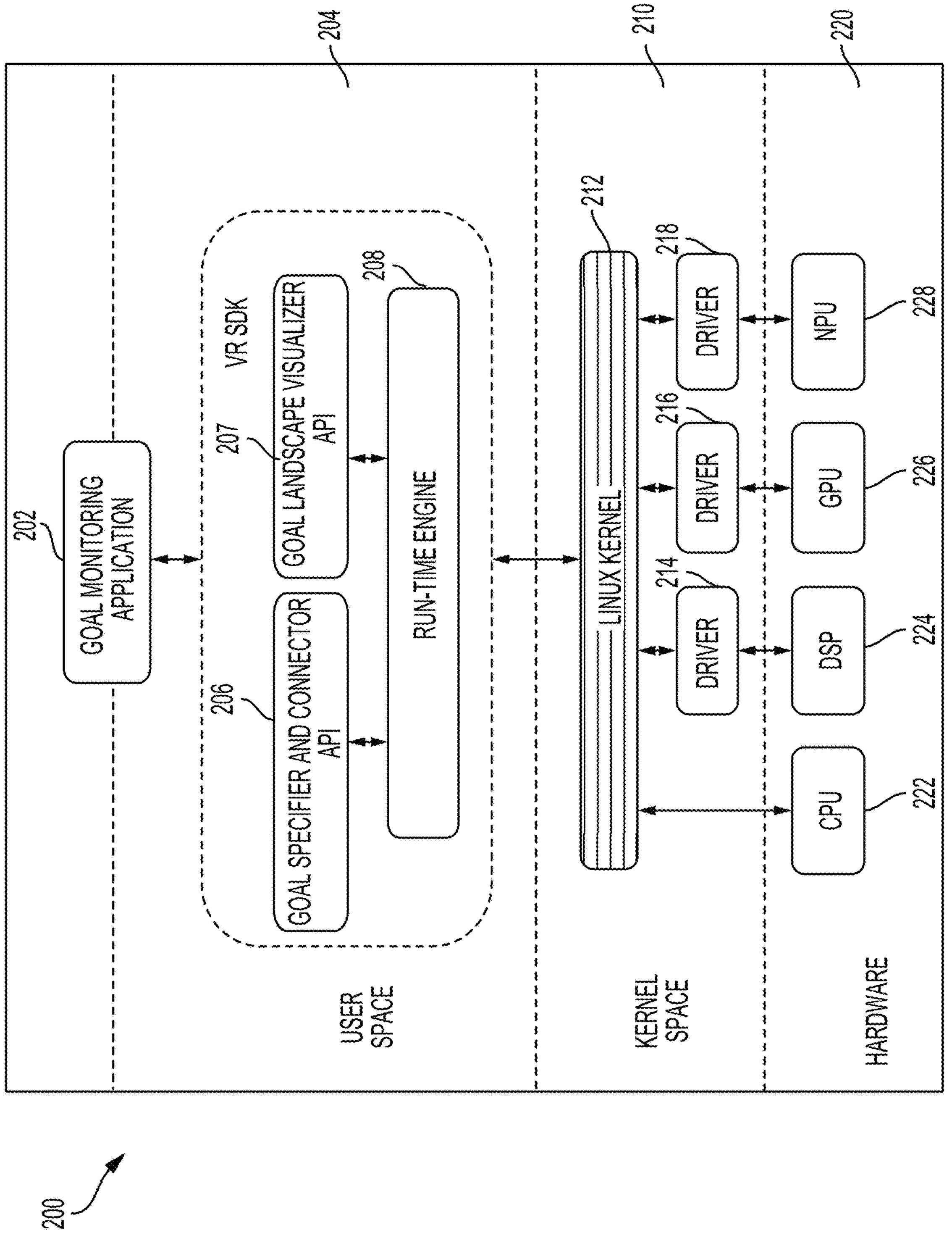
FIG. 2 is a block diagram illustrating an exemplary software architecture that may modularize artificial intelligence (AI) functions of a goal progression and visualization system, according to aspects of the present disclosure.

FIG. 2 is a block diagram illustrating a software architecture 200 that may modularize artificial intelligence (AI) functions for a goal progression and visualization system, according to aspects of the present disclosure. Using the architecture, a goal monitoring application 202 may be designed such that it may cause various processing blocks of an SOC 220 (for example a CPU 222, a DSP 224, a GPU 226, and/or an NPU 228) to perform supporting computations during run-time operation of the goal monitoring application 202. FIG. 2 describes the software architecture 200 for the goal progression and visualization system. It should be recognized that the goal progression and visualization system is not limited to achieving user goals. According to aspects of the present disclosure, the goal progression and visualization system is applicable to enforcing and/or encouraging or discouraging any type of user behavior.

The goal monitoring application 202 may be configured to call functions defined in a user space 204 that may, for example, provide for goal assistance using an augmented reality display, such as a virtual reality headset. The goal monitoring application 202 may make a request for compiled program code associated with a library defined in a goal specifier and connector application programming interface (API) 206. The goal specifier and connector API 206 is configured to generate a graph-like structure according to user specified goals along with their associated timeframes and desired outcomes. In addition, the compiled program code of a goal landscape visualizer API 207 is configured to convert the graph-like structure into a topological landscape of hills and valleys representing the user specified goals along with their associated timeframes and desired outcomes. In addition, the compiled program code of the goal landscape visualizer API 207 is configured to display the topological landscape of hills and valleys representing the user specified goals along with their associated timeframes and desired outcomes.

A run-time engine 208, which may be compiled code of a run-time framework, may be further accessible to the goal monitoring application 202. The goal monitoring application 202 may cause the run-time engine 208, for example, to take actions to convert the graph-like structure into a topological landscape of hills and valleys representing the user specified goals along with their associated timeframes and desired outcomes. In response to interaction with the goal topological landscape display of the detected object, the run-time engine 208 may in turn send a signal to an operating system 210, such as a Linux Kernel 212, running on the SOC 220. FIG. 2 illustrates the Linux Kernel 212 as software architecture for a goal progression and visualization system using a virtual reality headset. It should be recognized, however, that aspects of the present disclosure are not limited to this exemplary software architecture. For example, other kernels may provide the software architecture to support the goal progression and visualization functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214, 216, 218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

As noted, conventional systems for visualizing goals and sub-goals do so as a hierarchy of text. These conventional systems are often too rigid to provide users with sufficient understanding regarding the relationships and progress of their goals. A system to increase user awareness of the user's goals, how the user's goals relate to each other, as well as the user's progress towards the user's goals by organizing and visualizing the user's goals, is desired.

Aspects of the present disclosure are directed to a goal progression and visualization system. In particular, some aspects of the present disclosure may utilize a graph-like structure to provide more flexible goal representation, as opposed to a strictly hierarchical structure. This graph-like structure may account for progress towards multiple goals according to their relationships, as well as highlighting proximal goals being achieved while allowing the user to maintain their motivation by keeping the larger goal in view. By maintaining a display of both proximal and distal goals and their rewards, the goal progression and visualization system can help reduce temporal discounting of distal goals, while increasing motivation using principles related to episodic simulation. By storing current and historical goal information, the goal progression and visualization system helps reduce the cognitive load associated with maintaining active mental representations of multiple goals, according to aspects of the present disclosure.

Figure 3:
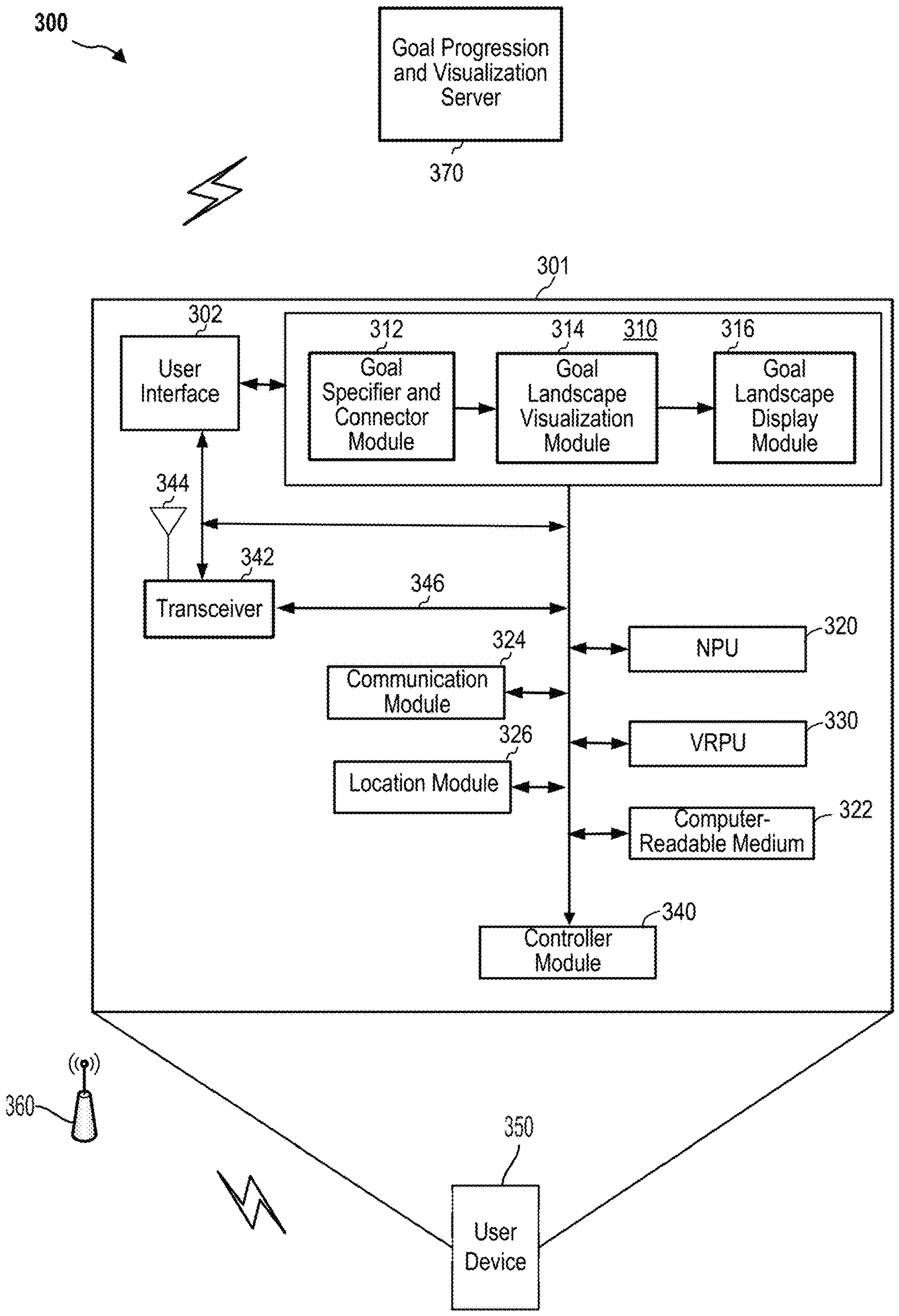
FIG. 3 is a diagram illustrating a hardware implementation of a goal progression and visualization system, according to aspects of the present disclosure.

FIG. 3 is a diagram illustrating a hardware implementation for a goal progression and visualization system 300, according to aspects of the present disclosure. The goal progression and visualization system 300 may be configured to generate a graph-like structure according to user specified goals along with their associated timeframes and desired outcomes. The goal progression and visualization system 300 is also configured to convert the graph-like structure into a topological landscape of hills and valleys representing the user specified goals along with their associated timeframes and desired outcomes. In addition, the goal progression and visualization system 300 is configured to display the topological landscape of hills and valleys representing the user specified goals along with their associated timeframes and desired outcomes.

The goal progression and visualization system 300 includes a goal monitoring system 301 and a goal progression and visualization server 370 in this aspect of the present disclosure. The goal monitoring system 301 may be a component of a user device 350. The user device 350 may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a global positioning system device, or any other suitable device that is configured to communicate via a wireless or wired medium.

The goal progression and visualization server 370 may connect to the user device 350 for generating a goal progression and visualization for the user. For example, the goal progression and visualization server 370 may generate a graph-like structure according to user specified goals along with their associated timeframes and desired outcomes. In response, the goal progression and visualization server 370 is configured to convert the graph-like structure into a topological landscape of hills and valleys representing the user specified goals along with their associated timeframes and desired outcomes. In addition, the goal progression and visualization server 370 is configured to transmit the topological landscape of hills and valleys representing the user specified goals along with their associated timeframes and desired outcomes for displaying on the user device 350.

The goal monitoring system 301 may be implemented with an interconnected architecture, represented generally by an interconnect 346. The interconnect 346 may include any number of point-to-point interconnects, buses, and/or bridges depending on the specific application of the goal monitoring system 301 and the overall design constraints. The interconnect 346 links together various circuits including one or more processors and/or hardware modules, represented by a user interface 302, a goal activity module 310, a neutral network processor (NPU) 320, a computer-readable medium 322, a communication module 324, a location module 326, a virtual reality (VR) processing unit (VRPU) 330, and a controller module 340. The interconnect 346 may also link various other circuits such as timing sources, peripherals, voltage regulators, and power management circuits, which are well known in the art, and therefore, will not be described any further.

The goal monitoring system 301 includes a transceiver 342 coupled to the user interface 302, the goal activity module 310, the NPU 320, the computer-readable medium 322, the communication module 324, the location module 326, the VRPU 330, and the controller module 340. The transceiver 342 is coupled to an antenna 344. The transceiver 342 communicates with various other devices over a transmission medium. For example, the transceiver 342 may receive commands via transmissions from a user or a connected vehicle. In this example, the transceiver 342 may receive/transmit information for the goal activity module 310 to/from connected devices within the vicinity of the user device 350.

The goal monitoring system 301 includes the NPU 320 coupled to the computer-readable medium 322. The NPU 320 performs processing, including the execution of software stored on the computer-readable medium 322 to provide a neural network model for user monitoring and advice recommendation functionality according to the present disclosure. The software, when executed by the NPU 320, causes the goal monitoring system 301 to perform the various functions described for presenting the topological landscape of hills and valleys representing the user specified goals along with their associated timeframes and desired outcomes through the user device 350, or any of the modules (e.g., 310, 324, 326, 330, and/or 340). The computer-readable medium 322 may also be used for storing data that is manipulated by the VRPU 330 when executing the software to analyze user communications.

The location module 326 may determine a location of the user device 350. For example, the location module 326 may use a global positioning system (GPS) to determine the location of the user device 350. The location module 326 may implement a dedicated short-range communication (DSRC)-compliant GPS unit. A DSRC-compliant GPS unit includes hardware and software to make the autonomous vehicle 350 and/or the location module 326 compliant with the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 342. For example, the communication module 324 may be configured to provide communication capabilities via different wireless protocols, such as 5G new radio (NR), Wi-Fi, long term evolution (LTE), 4G, 3G, etc. The communication module 324 may also communicate with other components of the user device 350 that are not modules of the goal monitoring system 301. The transceiver 342 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

The goal monitoring system 301 also includes the VRPU 330 to present the topological landscape of hills and valleys representing the user specified goals along with their associated timeframes and desired outcomes to the user in virtual reality. From behavioral science, it is recognized that intervening at the sensory level, so that the user is conscious of user specified goals to prevent deviating from pursuing their intended goal, is desired. As a result, the goal monitoring system 301 may allow a human user to interact in virtual reality with behavior goals of the user using the VRPU 330. In these aspects of the present disclosure, the goal activity module 310, in conjunction with the VRPU 330, allows a user to interact with specified goals on an augmented reality headset. The goal activity module 310, in conjunction with the VRPU 330, presents the user with a topological landscape of hills and valleys representing the user specified goals along with their associated timeframes and desired outcomes.

The goal activity module 310 may be in communication with the user interface 302, the NPU 320, the computer-readable medium 322, the communication module 324, the location module 326, the VRPU 330, the controller module 340, and the transceiver 342. In one configuration, the goal activity module 310 monitors communications from the user interface 302. The user interface 302 may monitor user communications to and from the communication module 324. According to aspects of the present disclosure, the VRPU 330 may use computer vision techniques to present the user with a topological landscape of hills and valleys representing the user specified goals along with their associated timeframes and desired outcomes.

As shown in FIG. 3, the goal activity module 310 includes a goal specifier and connector module 312, a goal landscape visualization module 314, and a goal landscape display module 316. The goal specifier and connector module 312, the goal landscape visualization module 314, and the goal landscape display module 316 may be components of a same or different artificial neural network. This configuration of the goal activity module 310 includes the goal specifier and connector module 312 configured to generate a graph-like structure according to user specified goals along with their associated timeframes and desired outcomes. In addition, the goal activity module 310 includes the goal landscape visualization module 314 configured to convert the graph-like structure into a topological landscape of hills and valleys representing the user specified goals along with their associated timeframes and desired outcomes. In addition, the goal activity module 310 includes the goal landscape display module 316 configured to display the topological landscape of hills and valleys representing the user specified goals along with their associated timeframes and desired outcomes. In some aspects of the present disclosure, the goal activity module 310 may work in conjunction with the goal progression and visualization server 370.

In aspects of the present disclosure, the goal progression and visualization system 300 relies on augmented reality techniques for assisting individuals in visualizing goals and their interconnections. The goal progression and visualization system 300 includes an augmented reality (AR) headset (e.g., the user device 350) that can be worn by a user. As the user wears the AR headset, the user is presented with a topological landscape of hills and valleys representing the user specified goals along with their associated timeframes and desired outcomes to help visualize and eventually achieve the user specified goals, for example, as shown in FIG. 4.

Figure 4:
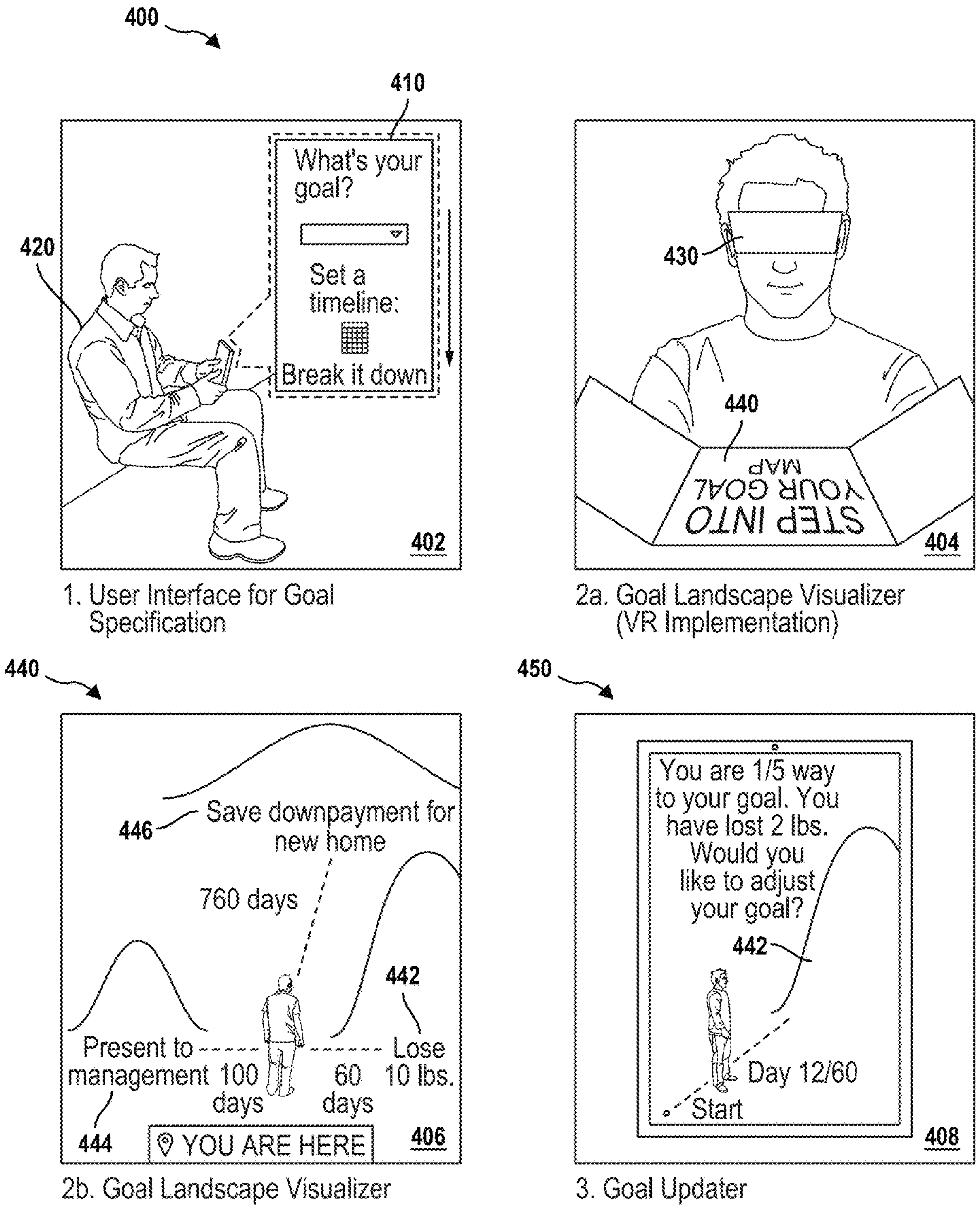
FIG. 4 is a block diagram illustrating an interaction method of a goal progression and visualization system, in accordance with aspects of the present disclosure.

FIG. 4 is a block diagram illustrating an interaction method of a goal progression and visualization system, in accordance with aspects of the present disclosure. A method 400 begins a block 402, in which a user 420 accesses a web application interface 410 (e.g., a user interface) to goals and associated timelines, and relationships using the user device 350. The web application interface 410 may request, from the user, alternative actions for achieving the user specified goals and an effort associated with the alternative actions. In some aspects of the present disclosure, as each new goal is specified, the goal progression and visualization system can help the user 420 organize how new goals are related to current and/or previous goals. For example, the goal progression and visualization system can ask the user whether a given user specified goal helps bring the user 420 closer to another user specified goal, provides an alternative path towards a user specified goal, or hinders the achievement of an existing user specified goal. In some aspects of the present disclosure, the goal visualization can be shown on an interactive computer display (e.g., tablet, monitor) or in a more immersive 3D virtual reality (e.g., Oculus) environment.

As noted, people often need to pursue multiple goals simultaneously and need effective ways to organize and prioritize their goals. In addition, user specified goals can stretch out over time and may be related to each other, although it is often difficult to keep track of these relationships. At block 404, the user 420 wears an augmented reality headset 430 that displays a topological landscape map 440 of hills and valleys representing the user specified goals along with their associated timeframes and desired outcomes. In some aspects of the present disclosure, the user 420 personalizes the visual aesthetic of the topological landscape map 440 by selecting from a library of visualizations. These aspects of the present disclosure provide personalized visualizations from which each user selects that are the most useful metaphor for their goals, thereby reinforcing the mental representation of goal relationships and progress and, consequently, motivation.

At block 406 a goal landscape visualizer component of the goal progression and visualization system further illustrates the topological landscape map 440. For example, one user may choose to represent goals as peaks in a mountain range (as shown in FIG. 4), while another may choose a more abstract space with color heatmaps projected onto a topography. The goal landscape visualizer component may take the graph structure and visualize it as a topological landscape with hills and valleys. For example, user specified goals that are difficult to achieve from a given point might be far ahead on tall hills, and goals that are relatively easier to achieve are close ahead and on level ground or even downhill. The user 420 can use the landscape to identify which paths and sub-goals may be most worthwhile to pursue. For example, goals with steady effort or goals with easy initial paths may be worthwhile to pursue because they are a simpler way to gain progress. The visualizer component can also highlight goal states that are currently achievable from the user's current state, as well as allow the user to look ahead to a more distant goal to remind the user of the ultimate outcome (and associated core rewards), which can facilitate motivation.

In this example, the topological landscape map 440 illustrates three user specified goals along with the amount of days indicating a timeline for each of the three user specified goals. A first user specified goal 442 is losing 10 pounds, which has a 60 day timeline for completing the first user specified goal 442 and is presented as a steep hill to indicate the associated difficulty. A second user specified goal 444 is a management presentation, which has a 100 day timeline for completing the second user specified goal 444. In this example, the second user specified goal 444 is presented as a less steep hill to indicate the associated difficulty of the second user specified goal 444 is less than the associated difficulty of the first user specified goal 442. The third user specified goal 446 is saving for a down payment for a new home, which has an associated timeline of 750 days for completing the third user specified goal 446.

As mentioned above, a sense of progress towards goals can increase motivation and engagement, and lead to further progress. Typically, systems for visualizing goals and sub-goals do so as a hierarchy of text. These conventional solutions are often too rigid to provide users with sufficient understanding as to the relationships and progress of their goals. At block 408, a goal update component of the goal progression and visualization system further illustrates an updated goal map 450 of the topological landscape map 440. For example, the updated goal map 450 provides an update regarding the first user specified goal 442 of losing 10 pounds.

In this example, the updated goal map 450 provides an update at day 12 of 60 for completing the first user specified goal 442. As shown, the updated goal map 450 provides an update indicating that the user 420 is ⅓ of the way from achieving their goal by having successfully lost 2 pounds (lbs.). The user 420 is also provided the option of adjusting the first user specified goal 442. Goals may be presented as points on the landscape, and actions may be presented as paths or stepping stones towards those points. By maintaining both proximal and distal goals and their rewards, the system can help reduce temporal discounting of distal goals (thereby increasing motivation) using principles related to episodic simulation.

By storing current and historical goal information, the system also can help reduce the cognitive load associated with maintaining active mental representations of multiple goals. In some aspects of the present disclosure, the goal progression and visualization system automatically solicits progress updates from the user 420 via periodic prompts or manually via user-initiated feedback. The goal progression and visualization system can allow the user to link tracking devices that can automatically provide quantitative information about whether a specific goal has been achieved. The visualization of the updated goal map 450 is modified based on the current state of the user 420.

Figure 5:
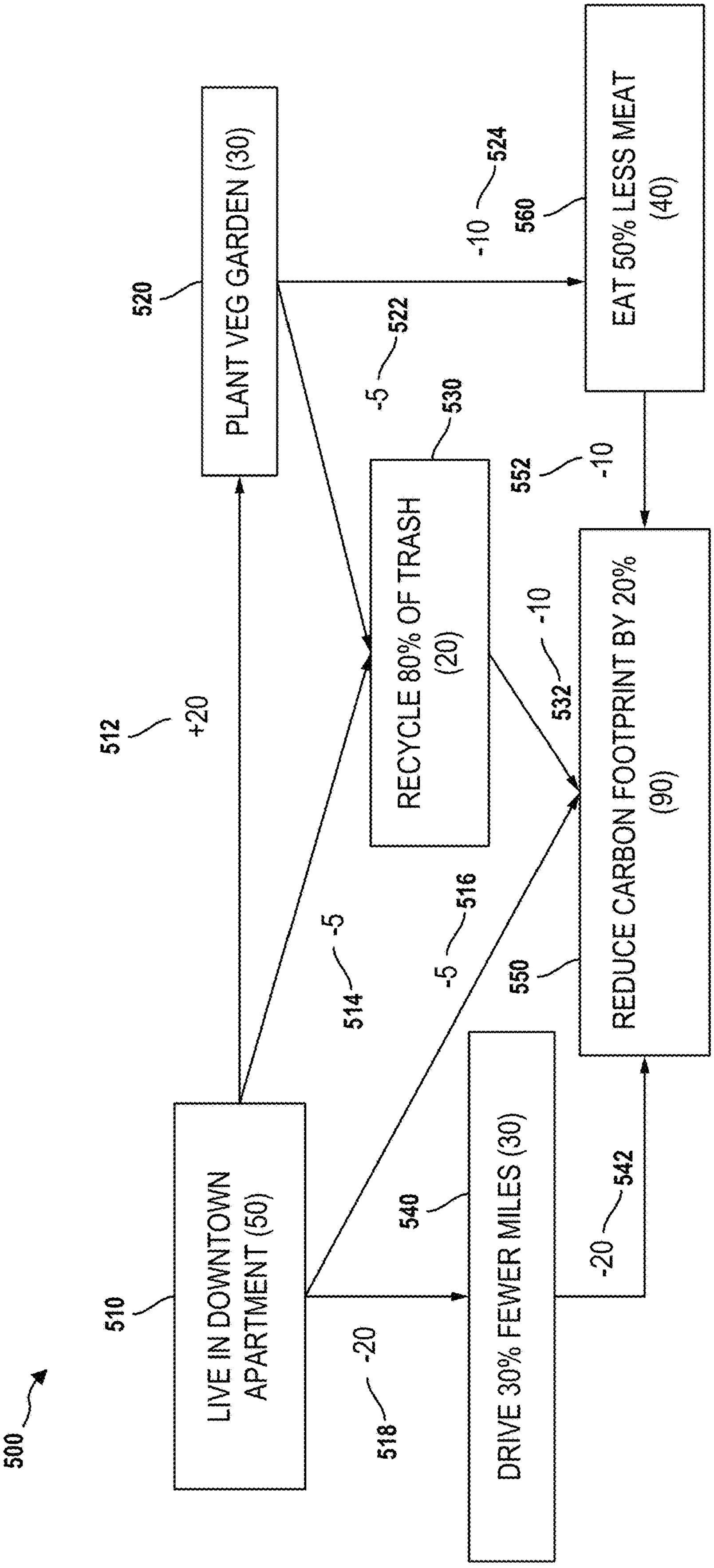
FIG. 5 is a block diagram further illustrating a directed graph of a goal progression and visualization system, in accordance with aspects of the present disclosure.

FIG. 5 is a block diagram further illustrating a directed goal graph 500 of a goal progression and visualization system, in accordance with aspects of the present disclosure. These aspects of the present disclosure utilize a graph-like structure to provide more flexible goal representation, allowing for accounting of progress towards multiple goals according to their relationships. The graph-like structure also highlights the proximal goals achieved while allowing the user to maintain their motivation by keeping a larger goal in view. The graph-like structure can be used to drive a visualization showing a landscape of the goals, as shown in FIG. 4.

In these aspects of the present disclosure, the user specified goals and the corresponding effort to achieve the user specified goals are represented as nodes in the directed goal graph 500. A method for visualizing the user specified goals begins by receiving a set of nodes. In this example, a first node 510 indicates a user specified goal of living in a downtown apartment. A second node 520 indicates a goal of planting a vegetable garden, which a third node 530 indicates a goal of recycling 80% of the user's trash. A fourth node 540 indicates a user goal of driving 30% fewer miles, which a fifth node 550 indicates a goal of reducing a user carbon footprint by 20%, and a sixth node 560 indicates a goal of eating 50% less meat.

The method for visualizing the user specified goals also includes assigning a set of effort values to the set of nodes. For example, the first node 510 is assigned an effort value of 50, whereas the fifth node is assigned an effort value of 90. According to the assigned effort values, the goal of living in a downtown apartment involves less effort (e.g., 50) than the goal of reducing a user carbon footprint by 20% (e.g., 90>50). The method for visualizing the user specified goals further includes receiving a set of edges to the set of nodes, assigning a set of values to the set of edges, and generating a graph based on the set of nodes and the set of edges. The method for visualizing the user specified goals also includes determining a visual theme, generating a visualization based on the graph and the visual theme, identifying goals that are achievable based on the sets of values.

In the example shown in FIG. 5, the directed edges correspond to how much achieving the outbound goal increases or decreases the effort to achieve the inbound goal. For example, for goals A and B and a directed edge {A, B}, the edge's weight is the change in the effort needed to accomplish B having accomplished A. As shown in FIG. 5, once the goal of living in a downtown apartment is achieved at the first node 510, achieving the goal of planting a vegetable garden involves an effort 512 of +20. Additionally, once the goal of planting a vegetable garden is achieved, an effort 522 of −5 is specified to achieve the goal of recycling 80% of the user's trash, and an effort 524 of −10 is specified to achieve the goal of eating 50% less meat, from which an effort 552 of −10 is specified to achieve the goal of reducing a carbon footprint by 20%. In this example, effort can be positive or negative, as achieving some goals can make it more or less difficult to achieve a related goal. For example, once the goal of living in a downtown apartment is achieved at the first node 510, achieving the goal of driving 30% fewer miles at the fourth node 540 includes an effort 518 of −20, which includes an effort 542 of −20 to achieve the goal of reducing a carbon footprint by 20%. An effort 516 of −5 is specified to achieve the goal of reducing a carbon footprint by 20%, and an effort 514 of −5 to achieve the goal of recycling 80% of the user's trash is specified from the goal of living in the downtown apartment. Once the goal of recycling 80% of the user's trash is achieved, an effort 532 of −10 is specified to achieve the goal of reducing a carbon footprint by 20%. A goal progression and visualization system may engage in a process, for example, as shown in FIG. 6.

Figure 6:
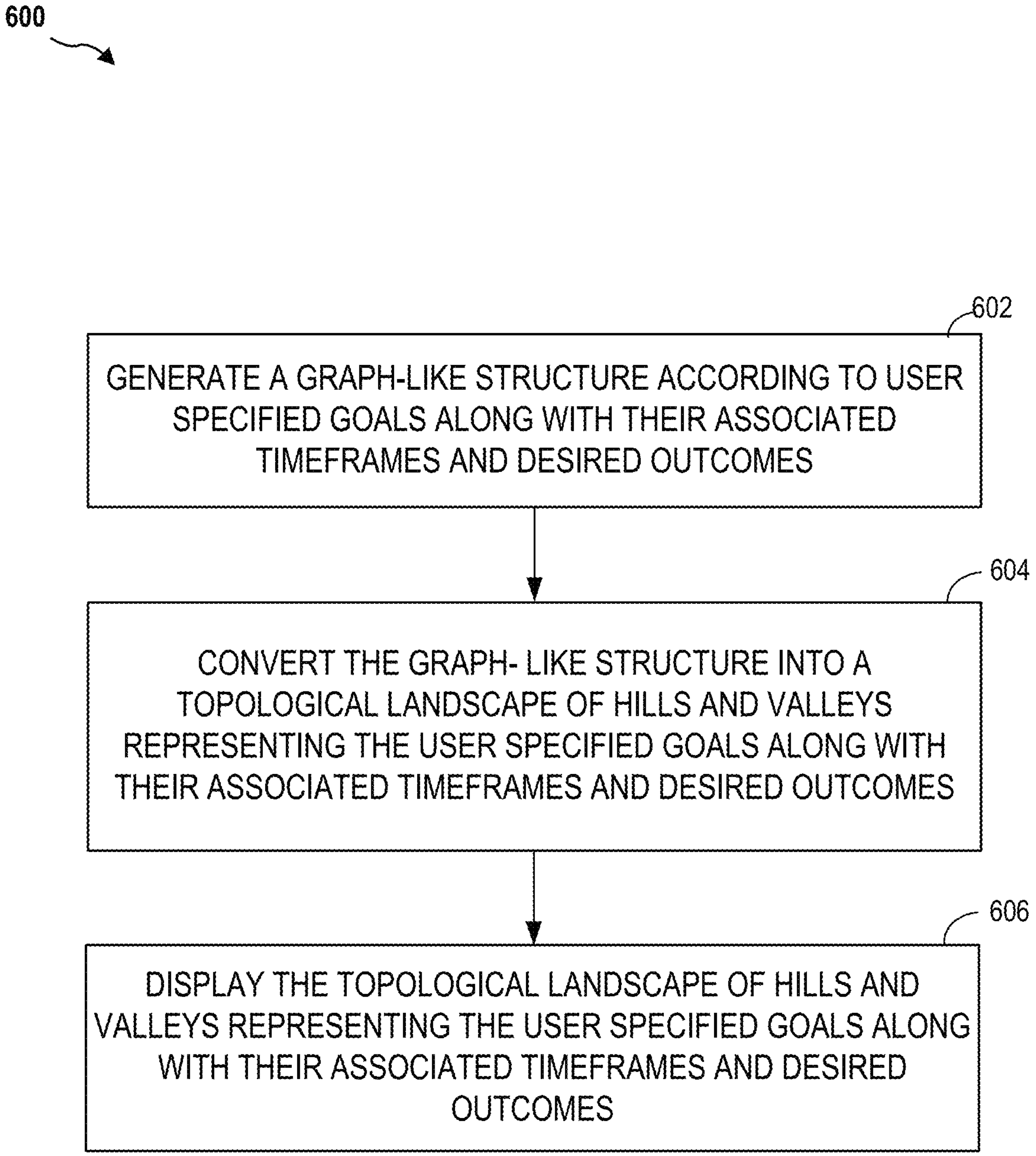
FIG. 6 is a flowchart illustrating a method for goal progression and visualization, according to aspects of the present disclosure.

FIG. 6 is a flowchart illustrating a method for goal progression and visualization, according to aspects of the present disclosure. A method 600 of FIG. 6 begins at block 602, in which a graph-like structure is generated according to user specified goals along with their associated timeframes and desired outcomes. For example, as shown in FIG. 4, the user 420 accesses the web application interface 410 (e.g., a user interface) to goals along with their associated timeframes and desired outcomes. As described in FIG. 5, the directed goal graph 500 is generated and includes a first node 510 that indicates a user specified goal of living in a downtown apartment. A second node 520 indicates a goal of planting a vegetable garden, which a third node 530 indicates a goal of recycling 80% of the user's trash. A fourth node 540 indicates a user goal of driving 30% fewer miles, which a fifth node 550 indicates a goal of reducing a user carbon footprint by 20%, and a sixth node 560 indicates a goal of eating 50% less meat.

Referring again to FIG. 6, at block 604, the graph-like structure is converted into a topological landscape of hills and valleys representing the user specified goals along with their associated timeframes and desired outcomes. For example, as shown in FIG. 4, at block 404, the user 420 wears the augmented reality headset 430 that displays a topological landscape map 440 of hills and valleys representing the user specified goals along with their associated timeframes and desired outcomes. In some aspects of the present disclosure, the user 420 personalizes the visual aesthetic of the topological landscape map 440 by selecting from a library of visualizations. These aspects of the present disclosure provide personalized visualizations from which each user selects that are the most useful metaphor for their goals, thereby reinforcing the mental representation of goal relationships and progress and, consequently, motivation. For example, one user may choose to represent goals as peaks in a mountain range (as shown in FIG. 4), while another may choose a more abstract space with color heatmaps projected onto a topography.

At block 606, the topological landscape of hills and valleys representing the user specified goals are displayed along with their associated timeframes and desired outcomes. For example, as shown in FIG. 4, At block 406 a goal landscape visualizer component of the goal progression and visualization system further illustrates the topological landscape map 440. In this example, the topological landscape map 440 illustrates three user specified goals along with the amount of days indicating a timeline for each of the three user specified goals. A first user specified goal 442 is losing 10 pounds, which has a 60 day timeline for completing the first user specified goal 442 and is presented as a steep hill to indicate the associated difficulty. A second user specified goal 444 is a management presentation, which has a 100 day timeline for completing the second user specified goal 444. In this example, the second user specified goal 444 is presented as a less steep hill to indicate the associated difficulty of the second user specified goal 444 is less than the associated difficulty of the first user specified goal 442. The third user specified goal 446 is a saving for a down payment for a new home, which has an associated timeline of 750 days for completing the third user specified goal 446.

The method 600 may also include determining whether any of the user specified goals bring the user closer to any other ones of the user specified goals, provide an alternative path towards one of the user specified goals, or hinders an existing one of the user specified goals to provide goal inter-relationships. The method 600 may also include organizing the user specified goal according to the determined, goal inter-relationships. The method 600 may also include displaying more difficult ones of the user specified goals on the hills of the topological landscape of hills and valleys. The method 600 may also display less difficult ones of the user specified goals on the hills of the topological landscape of hills and valleys.

In some aspects of the present disclosure, the goal progression and visualization system includes a goal specifier and connector, a goal landscape visualizer, and a goal updater. In one configuration, the goal specifier and connector component allows the user to specify goals along with their associated timeframes and desired outcomes. The goal progression and visualization system may elicit from the user alternative actions for achieving the goal and the effort associated with the alternative actions. With each new goal specified, the goal progression and visualization system can help the user organize how new goals are related to current and/or previous goals. For example, the goal progression and visualization system can ask the user whether a given goal helps bring the user closer to another goal, provides an alternative path towards a goal, or hinders the achievement of an existing goal.

The various operations of methods described above may be performed by any suitable means capable of performing the corresponding functions. The means may include various hardware and/or software component(s) and/or module (s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for goal progression and visualization, comprising:

generating a graph structure according to specified goals from a user along with their associated timeframes and desired outcomes;

converting the graph structure into a topological landscape of hills and valleys representing the user specified goals along with the associated timeframes and desired outcomes;

displaying, through an augmented reality (AR) headset, an interface illustrating a library of available 3D visualizations to enable the user to select from the available 3D visualizations;

receiving, through the interface of the AR headset, a personalized 3D visualization selected from the library of 3D visualizations by the user through the interface of the AR headset;

displaying, through the AR headset, a personalized 3D visualization of the user specified goals including the topological landscape of hills and valleys according to the user selected personalized 3D visualization along with the associated timeframes and desired outcomes; and providing, through the AR headset, the interface to enable the user to update the user specified goals and/or the personalized 3D visualization from the library of available 3D visualization showing a display of the user positioned within the associated timeframes and desired outcomes based on a current progress of the user toward meeting the user specified goals.

2. The method of claim 1, in which generating the graph structure further comprises requesting, from the user, alternative actions for achieving the user specified goals and an effort associated with the alternative actions.

3. The method of claim 1, in which generating the graph structure further comprises:

determining whether any of the user specified goals bring the user within an increased proximity to any other ones of the user specified goals, provides an alternative path towards one of the user specified goals, or hinders an existing one of the user specified goals to provide goal inter-relationships; and organizing the user specified goals according to the goal inter-relationships.

4. The method of claim 1, in which generating the graph structure further comprises:

representing the user specified goals as nodes in the graph structure; and connecting the nodes of the graph structure using directed edges to correspond to an amount of achieving an outbound goal to increase or decrease an effort to achieve an inbound goal.

5. The method of claim 1, in which displaying further comprises:

displaying more difficult ones of the user specified goals on the hills of the topological landscape of hills and valleys; and displaying less difficult ones of the user specified goals on the hills of the topological landscape of hills and valleys.

6. The method of claim 1, in which for a directed edge {A, B} of the graph structure, a weight of the directed edge is a change in an effort needed to accomplish a goal B having accomplished a goal A.

7. A non-transitory computer-readable medium having program code recorded thereon for goal progression and visualization, the program code being executed by a processor and comprising:

program code to generate a graph structure according to user specified goals along with their associated timeframes and desired outcomes;

program code to convert the graph structure into a topological landscape of hills and valleys representing the user specified goals along with the associated timeframes and desired outcomes;

program code to display, through an augmented reality (AR) headset, an interface illustrating a library of available 3D visualizations to enable the user to select from the available 3D visualizations;

program code to receive through the interface of the AR headset, a personalized 3D visualization selected from the library of 3D visualizations by the user through the interface of the AR headset;

program code to display, through the AR headset, a personalized 3D visualization of the user specified goals including the topological landscape of hills and valleys according to the user selected personalized 3D visualization along with the associated timeframes and desired outcomes; and program code to provide, through the AR headset, the interface to enable the user to update the user specified goals and/or the personalized 3D visualization from the library showing a display of the user positioned within the associated timeframes and desired outcomes based on a current progress of the user toward meeting the user specified goals.

8. The non-transitory computer-readable medium of claim 7, in which the program code to generate the graph structure further comprises program code to request, from the user, alternative actions for achieving the user specified goals and an effort associated with the alternative actions.

9. The non-transitory computer-readable medium of claim 7, in which the program code to generate the graph structure further comprises:

program code to determine whether any of the user specified goals bring the user within an increased proximity to any other ones of the user specified goals, provides an alternative path towards one of the user specified goals, or hinders an existing one of the user specified goals to provide goal inter-relationships; and program code to organize the user specified goals according to the goal inter-relationships.

10. The non-transitory computer-readable medium of claim 7, in which the program code to generate the graph structure further comprises:

program code to represent the user specified goals as nodes in the graph structure; and program code to connect the nodes of the graph structure using directed edges to correspond to an amount of achieving an outbound goal to increase or decrease an effort to achieve an inbound goal.

11. The non-transitory computer-readable medium of claim 7, in which the program code to display further comprises:

program code to display more difficult ones of the user specified goals on the hills of the topological landscape of hills and valleys; and program code to display less difficult ones of the user specified goals on the hills of the topological landscape of hills and valleys.

12. The non-transitory computer-readable medium of claim 7, in which for a directed edge {A, B} of the graph structure, a weight of the directed edge is a change in an effort needed to accomplish a goal B having accomplished a goal A.

13. A system for goal progression and visualization, the system comprising:

a goal specifier and connector module to generate a graph structure according to user specified goals along with their associated timeframes and desired outcomes;

a goal landscape visualization module to convert the graph structure into a topological landscape of hills and valleys representing the user specified goals along with the associated timeframes and desired outcomes to display, through an augmented reality (AR) headset, an interface illustrating a library of available 3D visualizations to enable the user to select from the available 3D visualizations, and to receive, through the interface of the AR headset, a personalized 3D visualization selected from the library of 3D visualizations by the user through the interface of the AR headset; and a goal landscape display module to display, through the AR headset, a personalized 3D visualization of the user specified goals including the topological landscape of hills and valleys according to the user selected personalized 3D visualization along with the associated timeframes and desired outcomes, and to provide, through the AR headset, the interface to enable the user to update the user specified goals and/or the personalized 3D visualization from the library of available 3D visualization showing a display of the user positioned within the associated timeframes and desired outcomes based on a current progress of the user toward meeting the user specified goals.

14. The system of claim 13, in which the goal landscape display module is further to present the topological landscape of hills and valleys representing the user specified goals along with the associated timeframes and desired outcomes on the AR headset.

15. The system of claim 13, in which the goal landscape display module is further to display more difficult ones of the user specified goals on the hills of the topological landscape of hills and valleys, and to display less difficult ones of the user specified goals on the hills of the topological landscape of hills and valleys.

* * * * *